Oct. 20, 1942.　　　A. M. DICKIE　　　2,299,569
FLATIRON
Filed July 31, 1940
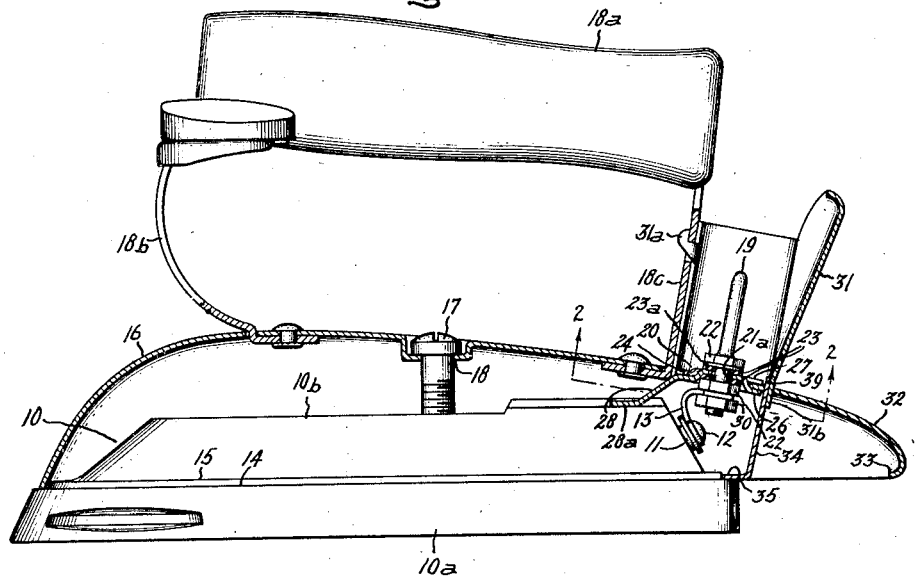
Inventor:
Alexander M. Dickie,
by Harry E. Dunham
His Attorney.

Patented Oct. 20, 1942

2,299,569

UNITED STATES PATENT OFFICE 2,299,569

FLATIRON

Alexander M. Dickie, Ontario, Calif., assignor to General Electric Company, a corporation of New York Application July 31, 1940, Serial No. 348,929

2 Claims. (Cl. 219—25)

This invention relates to flatirons, more particularly to electrically heated flatirons, and it has for its object the provision of improved terminal and heel rest structures in an iron of this character.

This invention contemplates the provision of an improved terminal structure for an electrically heated flatiron, whereby the terminal pins are supported in a simple, reliable and inexpensive manner without the use of screws, rivets or similar fastening devices.

It further contemplates an improved flatiron having a one-piece shell which functions as a cover for the sole plate and also forms a rearwardly extending heel rest.

A closure plate is provided for closing the space between the shell and the sole plate at the rear. This plate is supported between the sole plate and the shell and is held between them in such a way that screws, rivets or like fastening devices are not needed.

For a more complete understanding of this invention, reference should be had to the accompanying drawing in which Fig. 1 is an elevation partly in section of an electrically heated flatiron embodying this invention; Fig. 2 is a fragmentary sectional view taken along the line 2—2 of Fig. 1 and looking in the direction of the arrows; Fig. 3 is an enlarged fragmentary perspective view illustrating a portion of the flatiron of Fig. 1; and Fig. 4 is an enlarged perspective view of the closure plate which closes the shell of the iron at the rear.

Referring to the drawing, this invention has been shown in one form as applied to an electrically heated flatiron comprising a sole plate 10 having a pressing section 10a and a pressure section 10b, which preferably will be integrally united with the pressing section in any suitable manner, as by casting the two sections together. Embedded in the pressure section 10b is a suitable electrical heating element 11 which may be of any suitable type, but which preferably will be of the sheathed type, such as described and claimed in the United States patent to C. C. Abbott No. 1,367,341, dated February 1, 1921. This heating element is provided with a pair of terminals 12 to which suitable supply leads 13 are electrically connected.

As shown, the pressing section 10a is provided with a flat ledge 14 which surrounds the pressure section 10b. Also the pressure section 10b is surrounded by a second ledge 15 which is elevated somewhat above the ledge 14, as shown, so as to form a peripheral abutment around the section 10b.

The sole plate 10 is covered by means of a shell 16. The shell 16 at its point and sides rests upon the ledge 14, and it is secured in its assembled relation with the sole plate by means of a screw 17 which is directed through an aperture 18 provided for it in the shell, and which is received in threaded engagement with the sole plate 10. Preferably and as shown, the edges of the shell at the sides and point will fit relatively close against the abutment defined by the ledge 15. Mounted upon the shell is a handle 18a which is secured to the shell by arms 18b and 18c.

A pair of terminal pins 19 are provided for electrically supplying the heating element 11 through the leads 13 and the terminals 12. As shown, the pins 19 are rigidly secured to a terminal support 20. The terminal support 20 comprises a plate-like section 21 which is provided with a pair of apertures 21a through which the terminal pins are directed. The terminal pins are clamped to the plate 20 by means of nuts 22, and these nuts are electrically insulated from the plate by means of elongated electrically insulating sheets 23 covering the upper and lower surfaces of the plate 21, as shown in Figs. 1 and 3. The sheets 23 may be formed of any suitable electrically insulating material, such as mica. Interposed between the upper sheet 23 and the upper nuts 22 are metallic washers 23a.

The shell is provided with an elongated opening 24 which receives the terminal pins. It is contemplated that the supporting plate 21 for the pins will be mounted under the shell so as to bear on its under surface, and that the pins will project upwardly through the opening 24, as clearly shown in Fig. 1. The ends of the elongated slot or opening 24 are provided with rounded sections 24a, as clearly shown in Fig. 2, and the plate 21 is provided with rounded upright beads 25 around the openings through which the terminal pass, and which are received in the rounded sections 24a of the opening so as to closely fit the edges of the opening.

The plate 21 is provided at its rear edge with lugs or tongues 26 which are arranged to bear on the under surface of the shell adjacent the rear edge of the opening 24; it is also provided with a tongue or lug 27 between the lugs 26 and positioned in a plane above that of these lugs so that it engages the outer surface of the shell adjacent the rear edge of the opening 24. In other words, when the terminal plate is assembled with the iron, the two lugs 26 and the lug 27 above them function to secure the rear end of the plate to the shell.

The forward end of the plate 21 is provided with resilient feet or tabs 28 which extend downwardly and outwardly, as clearly shown in Figs. 1 and 3, to engage the top surface of the sole plate 10. Preferably, these members at their lower extremities will be provided with flat feet 28a which bear on the upper surface of the sole plate so as to hold the plate up in its position where its beads 25 are received in the opening 24.

Thus, when the shell 16 is secured to the sole plate, the terminal plate 21 will be located below the shell, and its upright beads 25 will be received in the curved sections 24a in the opening 24. The lugs 26 and 27 cooperate with the shell at the rear edge of the opening 24 to prevent displacement of the rear end of the plate, and the resilient legs 28 resiliently engage the upper surface of the sole plate 10 so as to be stressed sufficiently to hold the plate firmly up against the shell. In this manner, the terminal plate 20 with the terminals rigidly secured to it is securely held in its operative position in the iron. It will be observed that this has been accomplished without the use of screws, rivets or other similar fastening devices. Preferably and as shown, the sole plate will be provided with a pair of parallel ribs 28b which cooperate with the feet 28a so as to prevent sidewise movement of the terminal plate 20.

The leads 13 are electrically connected with the lower ends of the terminal pins by means of nuts 30.

Preferably, the terminal pins will be surrounded by a terminal guard 31 which is arranged to receive the supply plug of the usual twin-supply conductor (not shown). This guard has a hook 31a hooked into an aperture provided for it in the rear handle support 18c, and with a tongue 31b received in a slot provided for it in the upper wall of the shell 16, as shown in Fig. 1.

The shell 16 has integrally formed with it a rearwardly extending heel rest section 32. The shell tapers downwardly from a point adjacent the forward end of the iron through the heel rest section 32, as shown, and the rear edge of the shell terminates in a curved or folded-in section 33.

The space between the shell and the sole plate at the rear is closed by means of a closure member 34. The closure member 34 is positioned vertically in the iron, and at its lower end is provided with an inwardly extending flange 35 which is adapted to rest upon the rear section of the ledge 14, as shown in Fig. 1. At its upper end, the closure plate is provided with a pair of inwardly extending feet or tabs 36 which bear on the under surface of the shell, as shown in Fig. 2. These feet have at their inner ends upright hooks 37 which are hooked in slots or openings 38 provided for them in the shell and which as shown are located in the ends of the opening 24. The members 37 which are hooked to the shell and the flange 35 which bears upon the ledge 14 securely hold the closure plate 34 in its position to close the shell at the rear. When the shell is in place and secured to the sole plate, the hooks 37 function to hold the flange 35 firmly against the sole plate with its inner end abutting the edge 15, as shown. Preferably and as shown, the closure plate will also be provided with an upright tongue 39 which is directed upwardly through a slot provided for it in the top wall of the shell, as shown in Fig. 1. When the shell is in place and secured to the sole plate, the hooks 37 function to hold the flange 35 firmly against the sole plate ledge 14 with its inner end bearing against the abutment between the ledges 14 and 15, as shown.

The closure means for the space between the rear end of the sole plate and the shell 16 is described and claimed in my copending application, Serial No. 397,413, filed June 10, 1941, which application is a division of the present application.

It will be observed that the terminal pins 19 are supported in a simple, reliable and inexpensive manner without the use of screws, rivets and like fastening devices, and also that the plate 34 likewise is secured without the use of such fastening devices.

The curled or rolled-in edge 33 of the heel rest provides a smooth rounded surface which will not scratch the supporting surface of the iron when the iron is in an upright position on its heel and it will not catch the material being ironed as the iron is tipped back and forth between its upright and ironing positions.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. An electric flatiron comprising a sole plate, a shell for said sole plate having a terminal pin opening in the rear, terminal pins, a terminal plate supporting said pins in said opening having upraised parts received in the edges of said opening, and said plate at its rear edge being provided with upper and lower tongues which receive the rear edge of said opening between them, and the forward edge thereof being provided with spaced downwardly extending resilient feet which engage said sole plate so that said plate is held in position in said opening by said sole plate and shell.

2. An electric flatiron comprising a sole plate, terminal pins, a shell for said sole plate provided with a terminal pin opening, means detachably securing said shell to said sole plate, a terminal plate mounting said terminal pins arranged to bear on the under surface of said shell and having upraised sections arranged to project upwardly in said opening so as to closely fit edges thereof, interlocking means between said terminal plate and shell at one side of said opening, and said terminal plate opposite said side having a resilient member extending downwardly therefrom to engage said sole plate so as to be stressed thereby sufficiently to hold said terminal plate firmly up against the bottom surface of said shell when said shell is in place and attached to said sole plate.

ALEXANDER M. DICKIE.

CERTIFICATE OF CORRECTION.

Patent No. 2,299,569.　　　　　　　　　　　　October 20, 1942.

ALEXANDER M. DICKIE.

It is hereby certified that error appears in the printed specification of the above numbered patent requiring correction as follows: Page 2, second column, line 2, after "plate" insert --ledge 14--; line 3, for "abutting the edge 15" read --bearing against the abutment between the ledges 14 and 15--; line 7, beginning with the word "When" strike out all to and including "as shown" in line 12, and insert instead the following --This tongue further secures the closure plate in place--; and that the said Letters Patent should be read with this correction therein that the same may conform to the record of the case in the Patent Office.

Signed and sealed this 1st day of December, A. D. 1942.

(Seal)

Henry Van Arsdale,
Acting Commissioner of Patents.